United States Patent Office 3,582,412
Patented June 1, 1971

3,582,412
GELLED DINITROGEN TETROXIDE COMPOSITION
Charles E. Fogle, Sunnyvale, Calif., assignor to United Aircraft Corporation, East Hartford, Conn.
No Drawing. Filed Aug. 5, 1968, Ser. No. 749,965
Int. Cl. C06b 13/00
U.S. Cl. 149—74  3 Claims

ABSTRACT OF THE DISCLOSURE

Copolymers of chlorotrifluoroethylene and vinylidene fluoride are gelling agents for dinitrogen tetroxide which are capable of producing very viscous solutions in amounts of 10% or less by weight of the polymer. The gelled $N_2O_4$ is usable as the oxidizer in liquid propellant rocket motor systems.

BACKGROUND OF THE INVENTION

It has been recognized that one of the major hazards attendant large vehicle propulsion systems employing liquid propellants is the freeing of large quantities of inflammable or reactive materials in the event of a rupture of the propellant tankage. One approach to the solution of this problem has been to develop gelled propellants which have a relatively high viscosity and do not tend to flow in the event of rupture of the tankage. This approach has been satisfactory with respect to jet engine fuels and hydrocarbon type fuels for rocket propulsion systems, since many conventional gelling agents such as soaps and various polymers are known to be compatible with these fuel materials. With respect to the liquid oxidizer components of rocket propulsion systems, such as $N_2O_4$ the highly reactive nature of the oxidizer itself has limited the choice of the gelling agents to inorganic materials, particularly finely divided silica. While $SiO_2$ has been found to produce a suitable gel the inert nature of the material itself decreases the overall specific impulse of the propellant system since the $SiO_2$ is not susceptible to further oxidation. Various organic materials such as polymers, Teflon, Viton A, fluoroalkyl acrylate polymers and polymers of phosphonitrilic chloride have also been tried as gelling agents for $N_2O_4$ but were found to be unsatisfactory. According to this invention, however, I have discovered that the liquid oxidizer, dinitrogen tetroxide, ($N_2O_4$), may be gelled by the addition thereto of a copolymer of a vinylidene halide and perhalogenated ethylene without detrimental interaction of the oxidizer and the gelling agent. Further, extremely viscous gels are obtained in amounts of 10% by weight or less of the gelling agent and since the gelling agent is susceptible of further oxidation the overall specific impulse of the gelled propellant is maintained at a level higher than when the inert gelling agent silicon dioxide is employed.

Accordingly, it is an object of this invention to provide a gelling agent for dinitrogen tetroxide.

It is another object of this invention to provide a gelled composition consisting of dinitrogen tetroxide and copolymer or vinylidene fluoride and chlorotrifluoroethylene.

These and other objects of the invention will be readily apparent from the following description of the invention.

DESCRIPTION OF THE INVENTION

According to this invention it has been found that certain halogenated polymers are capable of gelling $N_2O_4$. These polymers are copolymers of perhalogenated ethylene and vinylidene fluoride preferably having molecular weights sufficiently high as to render the copolymer a solid at ambient temperatures. The preferred embodiments of this invention are the solid copolymers of chlorotrifluoroethylene and vinylidene fluoride since these polymers are commercially available under the name of Kel-F and have the lowest molecular weight per unit chain length of the readily available polymers. This latter aspect is important since if heavier halogens are substituted for the fluorine greater weight percents of the gelling agents would be required to form a gel of the same viscosity as with the preferred material thereby reducing the obtainable specific impulse.

These polymers have been found to produce an extremely viscous gel in amounts of from about 5 to 10% by weight with the $N_2O_4$. Lesser amounts of the polymer can be used if a lower viscosity gel is desired and while greater amounts will tend to increase the viscosity, no increase in viscosity over that obtained with 10% of the gelling agent is really required in order to retard the ready flowability of the $N_2O_4$. The gelled oxidizer composition so produced is suitable for use as the oxidizing agent in a bipropellant propulsion system in substantially the same manner as the prior art gelled oxidizer compositions employing silicon dioxide are used. However, the compositions of this invention produce a higher overall specific impulse than gelled compositions of similar viscosities using silicon dioxide as the gelling agent. This result is obtained because the polymeric gelling agents of this invention are capable of undergoing further combustion. Thus, while only 3% of $SiO_2$ is required to form an adequate gel, the susceptibility of the instant gelling agents to further oxidation permits a higher specific impulse to be obtained from oxidizers using as much as 10% of the instant gelling agents. The table sets forth various representative embodiments of this invention.

| Elastomer | Percent vinylidene fluoride | Percent chlorotrifluoroethylene | Weight percent $N_2O_4$ | Weight percent elastomer | Viscosity |
|---|---|---|---|---|---|
| Kel-F No. 3700 | 70 | 30 | 93.75 | 6.25 | Near solid gel. |
| Kel-F No. 5500 | 55 | 45 | 92.73 | 7.27 | Do. |
| Kel-F No. 827 [1] | 20 | 80 | 91.30 | 8.70 | Do. |
| Kel-F No. 800 | 20 | 80 | 90.18 | 9.82 | Do. |

[1] Kel-F No. 827 contains higher mol. wt. polymer than Kel-F No. 800.

The gels of the above table were produced by cutting the crumb form of the elastomer into small pieces and placing them in a glass tube containing a magnetic stirrer. The dinitrogen tetroxide was vacuum distilled onto the elastomer and stirred at room temperature for approximately two hours. At this time the elastomer had been completely dissolved in the oxidizer and an extremely viscous gel was produced.

While this invention has been described with respect to certain embodiments thereof it should not be construed as limited thereto. Further modifications and substitutions will be apparent to workers skilled in the art which can be paid without departing from the scope of the invention which is limited only by the following claims.

I claim:
1. A gelled oxidizer composition consisting essentially of $N_2O_4$ and a copolymer of a vinylidene halide and a perhalogenated ethylene.
2. The composition of claim 1 wherein said copolymer is a copolymer of vinylidene fluoride and chlorotrifluoroethylene.

3. The composition of claim 2 wherein said polymer is present in amounts less than 10% by weight.

References Cited

UNITED STATES PATENTS

| | | | |
|---|---|---|---|
| 3,083,526 | 4/1963 | Hudson | 149—74X |
| 3,146,139 | 8/1964 | Collins et al. | 149—74 |
| 3,221,494 | 12/1965 | Chu | 149—74X |
| 3,336,981 | 8/1967 | Barron et al. | 149—74X |
| 3,354,011 | 11/1967 | Kroon et al. | 149—74X |

LELAND A. SEBASTIAN, Primary Examiner

S. J. LECHERT, Jr., Assistant Examiner

U.S. Cl. X.R.

149—2; 252—316